No. 697,546. Patented Apr. 15, 1902.
J. J. & A. SCHIER.
PACKING GASKET.
(Application filed Jan. 2, 1902.)
(No Model.)
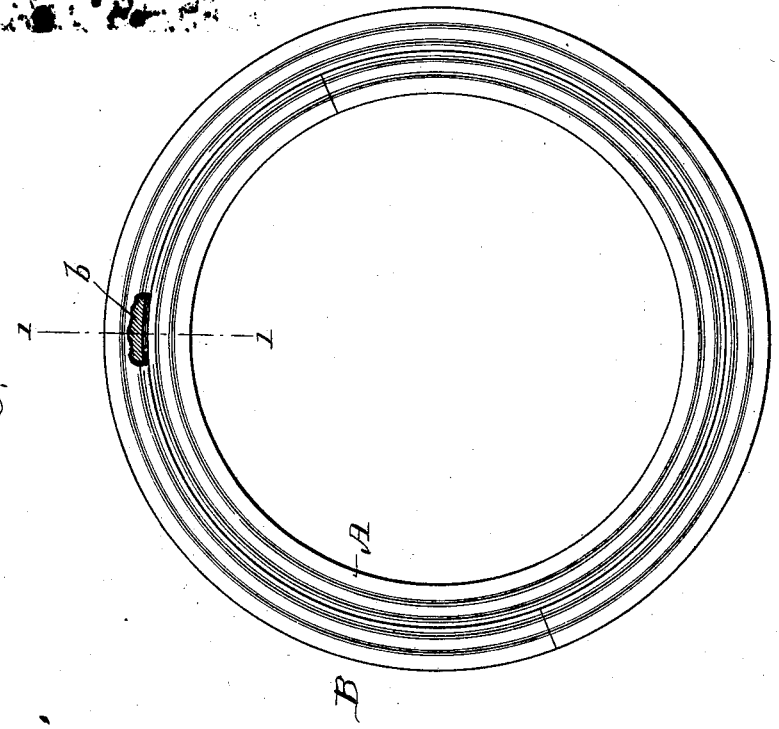

UNITED STATES PATENT OFFICE.

JOSEPH J. SCHIER AND ADOLPH SCHIER, OF MILWAUKEE, WISCONSIN.

PACKING-GASKET.

SPECIFICATION forming part of Letters Patent No. 697,546, dated April 15, 1902.

Application filed January 2, 1902. Serial No. 88,152. (No model.)

*To all whom it may concern:*

Be it known that we, JOSEPH J. SCHIER and ADOLPH SCHIER, citizens of the United States, and residents of Milwaukee, in the county of Milwaukee and State of Wisconsin, have invented certain new and useful Improvements in Packing-Gaskets; and we do hereby declare that the following is a full, clear, and exact description thereof.

Our invention has for its object to provide simple, economical, non-separable, and durable packing-gaskets of the species in which a ring of compressible soft metal or metallic composition is combined with a harder-metal retaining-ring; and it consists in such a gasket having the rings thereof in crimped tongue-and-groove union, as hereinafter more particularly set forth with reference to the accompanying drawings and subsequently claimed.

Figure 1 of the drawings represents a transverse section view of a portion of a packing-gasket in accordance with our invention, the plane of the section being indicated by line 1 1 in the second figure; and Fig. 2, a plan view of the gasket partly broken.

Referring by letter to the drawings, A indicates a ring of compressible soft metal or metallic composition, and B a harder-metal retaining-ring for the one aforesaid, the two rings being in crimped tongue-and-groove union, crimping of the joint serving to prevent the softer ring from slipping out of connection with the harder one.

Ring B is preferably copper and provided with an inner annular groove engaged by an outer tongue *b* of the softer ring, crimping of the joint to lock the tongue in the groove being done after the two rings are put together. The rings are bent into shape from straight strips of material, the ends of each being joined by solder, soldering of the inner ring being done after its union with the outer one is effected, both rings being herein shown flat and transversely corrugated.

By having the rings united, as herein set forth, the cost of production is cheapened and the most satisfactory results attained, it being impossible for the softer ring to get away from the harder one at any point of the circle without tearing. Hence it cannot be shook or bent out of place.

Having thus described our invention, what we claim as new, and desire to secure by Letters Patent, is—

1. A packing-gasket consisting of a ring of compressible soft metal or metallic composition and a harder metallic ring in crimped tongue-and-groove connection one within the other.

2. A packing-gasket consisting of a ring of compressible soft metal or metallic composition having an annular tongue, and a harder metallic ring provided with an annular groove in which the tongue of the former ring is crimped.

In testimony that we claim the foregoing we have hereunto set our hands, at Milwaukee, in the county of Milwaukee and State of Wisconsin, in the presence of two witnesses.

JOSEPH J. SCHIER.
ADOLPH SCHIER.

Witnesses:
N. E. OLIPHANT,
B. C. ROLOFF.